United States Patent [19]

Barbe et al.

[11] Patent Number: 5,266,101
[45] Date of Patent: Nov. 30, 1993

[54] MEMBRANE GAS GENERATOR IN ASSOCIATION WITH BULK STORAGE FOR INCREASED FLEXIBILITY AND PRODUCTIVITY

[75] Inventors: Christian Barbe, Fontenay Aux Roses; Jean-Renaud Brugerolle, Paris, both of France

[73] Assignee: L'Air Liquide, Societe Anonyme pour l'Etude et l'Exploitation des Procedes Georges, Paris, France

[21] Appl. No.: 935,167

[22] Filed: Aug. 26, 1992

[51] Int. Cl.$^5$ .............. B01D 53/22; B01D 63/04
[52] U.S. Cl. .............................. 95/23; 95/47; 96/8; 55/270
[58] Field of Search ........... 55/16, 18, 20, 68, 158, 55/270

[56] References Cited

U.S. PATENT DOCUMENTS

| 4,198,213 | 4/1980 | Mannatt | 55/16 |
|---|---|---|---|
| 4,681,602 | 7/1987 | Glenn et al. | 55/16 X |
| 4,806,132 | 2/1989 | Campbell | 55/18 X |
| 4,857,082 | 8/1989 | DiMartino, Sr. et al. | 55/158 X |
| 4,944,776 | 7/1990 | Keyser et al. | 55/158 X |
| 5,030,251 | 7/1991 | Rice et al. | 55/158 X |
| 5,053,058 | 10/1991 | Mitariten | 55/158 X |
| 5,063,753 | 11/1991 | Woodruff | 55/158 X |
| 5,069,692 | 12/1991 | Grennan et al. | 55/158 |
| 5,102,432 | 4/1992 | Prasad | 55/158 X |
| 5,118,327 | 6/1992 | Nelson et al. | 55/18 X |
| 5,129,921 | 7/1992 | Baker et al. | 55/16 |
| 5,131,929 | 7/1992 | Brockmann et al. | 55/158 X |
| 5,137,547 | 8/1992 | Chretien | 55/16 |
| 5,156,009 | 10/1992 | Woodruff | 55/16 X |

Primary Examiner—Robert Spitzer
Attorney, Agent, or Firm—Oblon, Spivak, McClelland, Maier & Neustadt

[57] ABSTRACT

A membrane nitrogen generator adapted to deliver a flow rate of nitrogen gas having a purity at least equal to $P_0$, which contains:
  a) a source of compressed nitrogen containing gas having a purity lower than $P_0$, the source having a maximum flow rate $Fm_1$;
  b) a varyer connected to the source, which is adapted to vary the flow rate of the source between $Fm_1$ and 0;
  c) a nitrogen membrane fed by the source which is capable of delivering a low purity nitrogen gas having a purity $P_1$, which purity is lower than $P_0$ at the maximum flow rate $Fm_1$;
  d) a source of high purity compressed nitrogen gas having a purity which is greater than $P_0$ which has a controllable flow rate of from 0 to a maximum flow rate value of $Fm_2$;
  e) a mixer; and
  f) a purity controller.

10 Claims, 2 Drawing Sheets

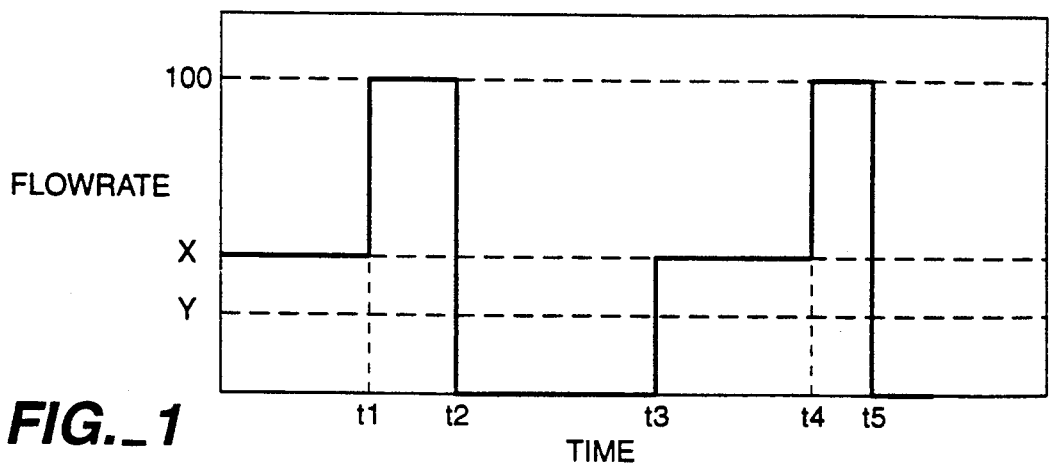
FIG._1
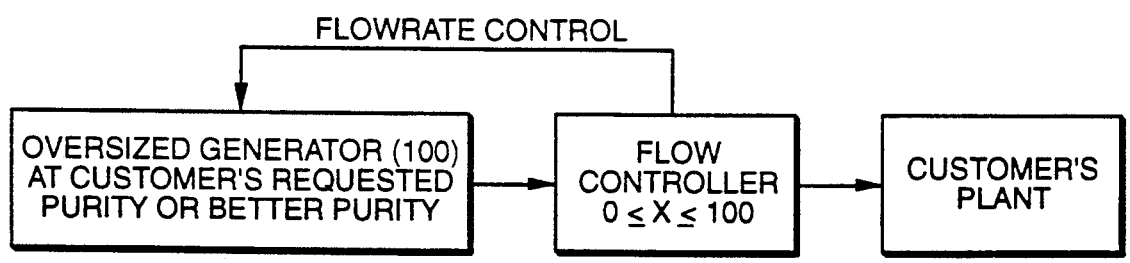
FIG._2
(PRIOR ART)
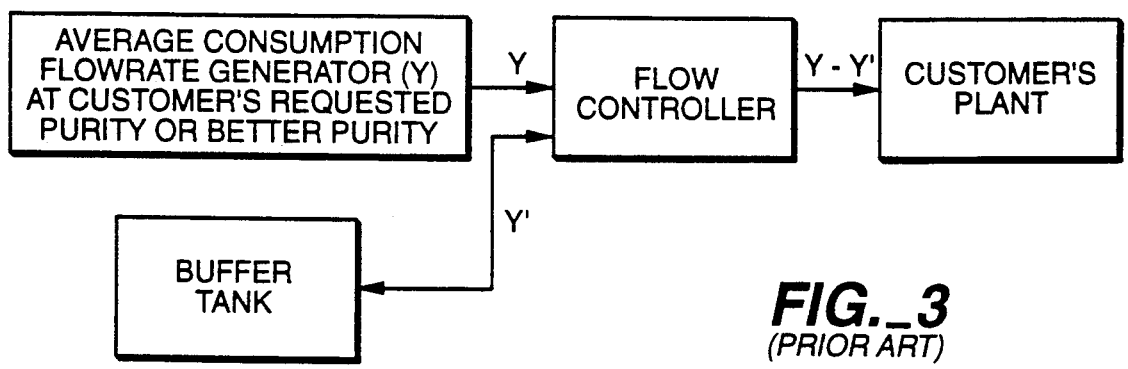
FIG._3
(PRIOR ART)

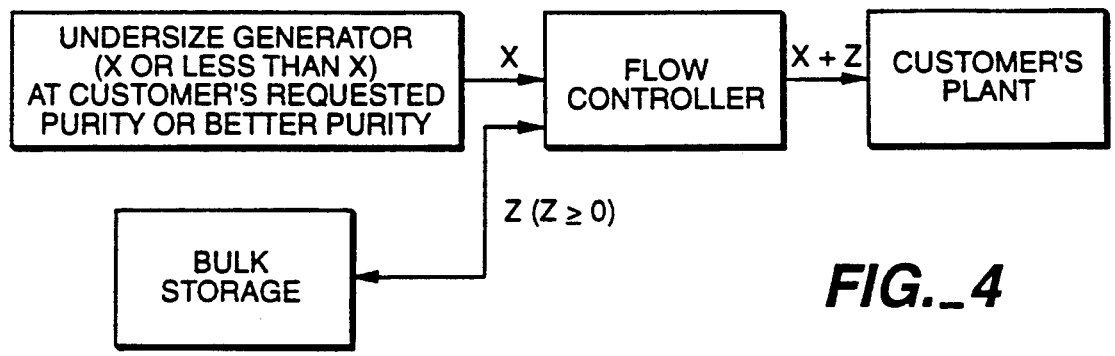
*FIG._4*
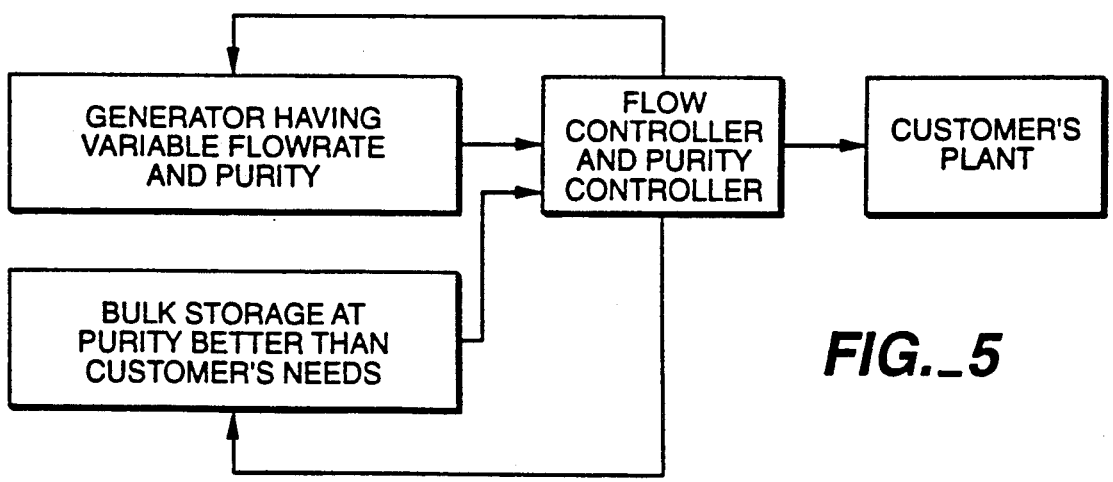
*FIG._5*

MEMBRANE GAS GENERATOR IN ASSOCIATION WITH BULK STORAGE FOR INCREASED FLEXIBILITY AND PRODUCTIVITY

BACKGROUND OF THE INVENTION

1. Field of the Invention

The present invention provides a membrane gas generator which is used in conjunction with bulk nitrogen storage to be responsive to changes in customer demand patterns while avoiding undue increases in generator and operating costs.

2. Description of the Background

Membrane process are used with increasing frequency in the production of inert atmospheres from air, wherein the oxygen content in a feed air stream to the membrane is decreased by permeation from a high pressure side to a low pressure side. However, it is very difficult to size the generator for customer need, as the demand is not straightforward. For example, demand often changes considerably both in the very short term, i.e. at ten minute intervals, and in the long term, i.e., with the change of seasons and from year to year. Of course, this difficulty is not specific to membrane process, but is applicable to any small-on site plant serving the needs of a single customer.

Although various methods have been proposed for overcoming this difficulty, all suffer from various disadvantages. For example, inert atmospheres have been produced at a pressure higher than required by customer need with storage of excess production in a buffer or storage tank during low demand periods with subsequent release during peak demand periods.

While, these solutions have been somewhat helpful in adapting to customer demand, in most cases it remains necessary to use an oversized generator, which can be detrimental to the process economy when annual usage of the facility is low.

Thus, a need exists for a membrane generator which exhibits increased flexibility and productivity and is responsive to changes in customer demand pattern while avoiding undue increases in generator and operating costs.

SUMMARY OF THE INVENTION

Accordingly, it is an object of the present invention to provide a method for responding to changes in customer flow demand patterns without incurring an undue increase in generator and operating costs.

It is also, in particular, an object of the present invention to provide a membrane nitrogen generator being capable of effecting the above method.

The above objects and others which will become more apparent in view of the following disclosure are provided by:

A membrane nitrogen generator which is adapted to deliver a flow rate of nitrogen gas having a purity which is at least equal to $P_0$, which entails:

(a) a source of compressed nitrogen-containing gas having a purity lower than $P_0$, said source having a maximum flow rate $Fm_1$;

(b) control means downstream of and in fluid connection with the source of compressed nitrogen-containing gas which is adapted to control the flow rate of said source between $Fm_1$ and zero;

(c) a nitrogen membrane downstream of and in fluid connection with the source of compressed nitrogen-containing gas and which is capable of delivering a low purity nitrogen gas enriched in nitrogen compared to the source and a nitrogen-depleted gas depleted in nitrogen compared to the source, the low purity nitrogen gas having a purity $P_1$ which increases when the flow rate of said nitrogen containing gas source feeding the membrane decreases, the purity $P_1$ being lower than $P_0$ at said maximum flow rate $Fm_1$;

(d) a source of high purity compressed nitrogen gas having a purity which is greater than $P_0$ delivering a high purity nitrogen gas having flow rate control means to control its flow rate from zero to a maximum flow rate value $Fm_2$:, said source of high purity compressed nitrogen gas being in fluid connection with said source of compressed nitrogen-containing gas having a purity lower than $P_0$;

(e) mixing means adapted to mix the low purity nitrogen gas and the high purity nitrogen gas and delivering a nitrogen gas mixture; said mixing means being downstream of both nitrogen membrane c) and source of high purity compressed nitrogen gas d); and (f) purity control means downstream of mixing means e) said purity control means adapted to measure the purity of the nitrogen gas mixture and to generate a signal to the flow rate control means to increase the flow rate of the high purity nitrogen gas when the measured purity of said nitrogen gas mixture is smaller than or equal to $P_0$ and to decrease the flow rate of the high purity nitrogen gas when the measured purity of said nitrogen gas mixture is greater than $P_0$.

BRIEF DESCRIPTION OF THE DRAWINGS

FIG. 1 illustrates a typical profile of flow rate with time for an oversized generator used in accordance with a conventional method.

FIG. 2 illustrates a conventional generator apparatus utilizing an oversized generator, and a flow controller.

FIG. 3 illustrates another conventional generator apparatus utilizing a mean consumption flow rate generator, flow controller and a buffer tank.

FIG. 4 illustrates an embodiment of the present invention utilizing an undersized generator, flow controller and bulk storage tank.

FIG. 5 illustrates another embodiment of the present invention utilizing a generator having the capability of variable flow rate and purity, and a bulk storage tank.

DETAILED DESCRIPTION OF THE PREFERRED EMBODIMENTS

In accordance, with the present invention, a means is provided for responding to customer flow demand patterns without unduly increasing generator and operating cost requirement. Further, this is accomplished without using an oversized generator.

In more detail, and in part the present invention provides a method for responding to changes in customer flow demand patterns for nitrogen without incurring an undue increase in generator and operating costs.

The present invention also provides, in part, a method for providing nitrogen gas to a customer at a variable flow rate, and at a given purity level regardless of the flow rate of the nitrogen gas.

The present invention also provides, in part, a membrane nitrogen generator which is adapted to deliver a flow rate of nitrogen gas having a purity which is at least equal to $P_0$, which contains:

a) a source of compressed nitrogen-containing gas having a purity lower than $P_0$, the source having a maximum flow rate $Fm_1$;

b) control means downstream of and in fluid connection with the source of compressed nitrogen-containing gas which is adapted to control the flow rate of the source between $Fm_1$ and zero;

c) a nitrogen membrane downstream of and in fluid connection with the source of compressed nitrogen-containing gas and which is capable of delivering a low purity nitrogen gas enriched in nitrogen compared to the source, the low purity nitrogen gas having a purity $P_1$ which increases when the flow rate of the nitrogen-containing gas source feeding the membrane decreases, the purity $P_1$ being lower than $P_0$ at the maximum flow rate $Fm_1$;

d) a source of high purity compressed nitrogen gas having a purity which is greater than $P_0$ delivering a high purity nitrogen gas having flow rate control means to control its flow rate from zero to a maximum flow rate value $Fm_2$, said source of high purity compressed nitrogen gas being in fluid connection with said source of compressed nitrogen-containing gas of having a purity lower than $P_0$;

e) mixing means adapted to mix the low purity nitrogen gas and the high purity nitrogen gas and delivering a nitrogen gas mixture; the mixing means being downstream of both nitrogen membrane c) and source of high purity compressed nitrogen gas d); and f) purity control means downstream of mixing means e) the purity control means adapted to measure the purity of the nitrogen gas mixture and to generate a signal to the flow rate control means to increase the flow rate of the high purity nitrogen gas when the measured purity of the nitrogen gas mixture is smaller than or equal to $P_0$ and to decrease the flow rate of the high purity nitrogen gas when the measured purity of the nitrogen gas mixture is greater than $P_0$.

Generally, the present invention integrates bulk storage of nitrogen and/or liquid in gaseous form with the oxygen content of the total system production, i.e., the mixture of membrane generator product and bulk (when used). This is found to be very advantageous inasmuch as the flow capacity of the nitrogen membrane generator increases as the oxygen content increases. Thus, by mixing with the stored bulk nitrogen, which is essentially oxygen-free, it becomes possible to increase membrane generator production while keeping the mixture oxygen content under a specified limit.

While any membrane may be used which is capable of delivering a permeate gas enriched in nitrogen relative to a feed gas, the present invention is of particular advantage when using hollow fiber tube-fed modules in the counter-current operating mode where a surprising phenomenon is observed. Notably, the oxygen content increase due to the production increase is much less than expected for shell-fed modules operated in the perfect counter-current mode.

The present membrane generator may use an undersized generator, a generator exhibiting a mean consumption flow rate or a generator which is capable of generating a variable flow rate and purity. In all cases, excess production may be stored in bulk storage in either liquid or gaseous form. Of course, the capacity or size of the bulk storage means, such as a tank, will depend upon the volume of stored product required per unit time.

Generally, there is no specific relationship between customer yearly demand and generator capacity as optimal generator capacity is very dependent on the customer demand profile. However, in general, optimum generator capacity is equal to about 2 to 4 times average hourly demand, computed as yearly demand divided by 8,760.

Generally, the bulk storage means is in fluid connection with the generator. If gaseous storage is desired, the product may be compressed before storage using conventional compressing means. If liquid storage is desired, the gaseous permeate stream from the generator may be liquified using a conventional liquefaction apparatus.

Further, the present membrane generator generally utilizes a flow rate controller which is downstream of both the generator and the bulk storage means and in fluid connection with each.

Preferably, in accordance with the present invention, the flow rate controller or control means for controlling the flow rate of the source of high purity compressed nitrogen gas is an on/off-type valve.

While the bulk storage means may be any means for storing product, it is preferably a tank, and the product stored is preferably nitrogen in liquid form.

Generally, the purity control means of the present invention is adapted to measure the purity of the low purity nitrogen gas and generate a signal to the flow rate control means to increase the flow rate of the high purity nitrogen gas when the measured purity of the nitrogen gas mixture is smaller than or equal to $P_0$ and to decrease the flow rate of the high purity nitrogen gas when the measured purity of the nitrogen gas mixture is greater than $P_0$.

Moreover, in accordance with the present invention, a computer means may be used in connection with the varying means and/or the purity control means to manage control of the same.

As note above, the membrane used may be any membrane which is capable of permeating a gas which is enriched in nitrogen relative to a feed stream. However, it is preferred that the nitrogen membrane comprises a plurality of hollow fibers forming a bundle which is encased in a substantially cylindrical shell forming altogether a module.

For example, the present membrane nitrogen generator may have a module which contains an input for feed gas from the nitrogen containing gas source, a first output for the permeate gas which permeates through the walls of the fibers of the bundle and a second output for the non-permeate gas or gas mixture which does not permeate through the fibers, wherein the input and first output are located on the shell of the model in such a way that the feed and the permeate gas circulate substantially counter current in the shell of the module.

The present invention also affords a process for providing nitrogen gas to a customer at a variable flow rate but at a purity which is greater than or at least equal to $P_0$, and preferably greater than $P_0$, regardless of the flow rate of the nitrogen gas, which entails providing a first source of high purity nitrogen gas having a purity which is greater than $P_1$ with $P_1 > P_0$ and a second occurrence of low purity nitrogen gas having a purity $P_2$ which is dependent upon its flow rate, the purity being lower than $P_0$ when the flow rate thereof is about maximum flow rate and greater than $P_0$ at lower flow rates, measuring the purity P of the low purity nitrogen gas, comparing P to $P_0$, and when $P<P_0$, mixing the high purity nitrogen gas to the low purity nitrogen gas and delivering to the customer a gas mixture which purity is greater than or at least equal to $P_0$, and when $P>P_0$, delivering directly the low purity nitrogen gas to the customer, the flow rate of the nitrogen gas provided to the customer being adjusted as required.

In accordance with this aspect of the present invention, the second source of low purity nitrogen gas entails a nitrogen membrane fed by a pressurized source of nitrogen containing gas. Further, the pressurized source of nitrogen gas is preferably a compressor for atmospheric air.

In general, $P_0$ will have a value of about 0.01% $O_2$ to about 10% $O_2$. Preferably, however, $P_0$ will have a value of about 0.1% $O_2$ to about 3% $O_2$. Moreover, $P_1$ will have a value, in general, of about 0.01% to about 10% $O_2$. Preferably however, $P_1$ will have a value of about 0.1% $O_2$ to about 3% $O_2$.

Further, $Fm_1$ will generally have a value of about 1 to about 10,000 $Nm^3/h$, with a preferred value of about 10 to about 2,000 $Nm^3/h$. $Fm_2$ will generally have a value of about 1 to about 10,000 $Nm^3/h$ with a preferred value of about 5 to 1,000 $Nm^3/h$.

Additionally, any membrane which is conventionally used to selectively permeate nitrogen may be used in accordance with the present invention.

In general, a feed source is used which is upstream of the separator equipment. As a feed source, compressing means is generally used.

Further, control means is used at an outlet of the feed source in order to achieve flow control. The control means may be, for example, a variable frequency electric power source feeding the compressing means, such as the motor of an air compressor. Thereby, a variable flow output may be obtained through a variable rotation speed. The control means may also be a sliding vane with electric or pneumatic controls, being part of a screw compressor casing, such as a Sullair compressor, achieving variable flow output through internal recirculation. Further, the control means may be the combination of an air receiver at the outlet of the compressing means with control means to start and stop the compressing means according to the feed demand.

Generally, the nitrogen membrane in fluid connection with the source of compressed nitrogen-containing gas is downstream of the feed source at all times. The source of high purity compressed nitrogen gas (d) is located on a side branch, while mixing means (e) is located downstream of both nitrogen membrane c) and source of high purity compressed nitrogen gas (d). Moreover, purity control means (f) is downstream of (e).

FIGS. 1-5 will now be explained in more detail.

FIG. 1 illustrates a typical profile of flow rate with time for an oversized generator used in accordance with a conventional method. This illustrates the inefficiency resulting from the use of an oversized generator, thus rendering such a process uneconomical.

FIG. 2 illustrates a conventional generator apparatus, which encompasses an oversized generator, and a flow controller.

FIG. 3 illustrates a conventional generator apparatus, which encompasses a mean consumption flow rate generator, flow controller and a buffer tank.

FIG. 4 illustrates an embodiment of the present invention, which encompasses an undersized generator, flow controller and bulk storage tank.

FIG. 5 illustrates another embodiment of the present invention, which utilizes a generator having the capability of variable flow rate and purity, and a bulk storage tank.

Generally, the storage capacity of the bulk storage means is selected based primarily upon the back-up function played by the bulk storage means in the event of generator failure. That is, a determination is made as to expected need in case of generator failure and a storage capacity is selected to meet that need. As an example, however, storage capacity will generally be about 1 to 3 days of customer average demand.

Furthermore, the bulk storage means may be any type of apparati conventionally used. The material of which the bulk storage means is constructed is determined by service conditions, such as cryogenic temperature and service pressure.

The present invention will now be further illustrated by reference to certain examples which are provided solely for purposes of illustration and are not intended to be limitative.

EXAMPLE 1

In a design according to the present invention, the unit is sized for 50 $m^3/h$ eg, and product $O_2$ content is increased to 2.775% $O_2$ during consumption surges to that generator production is boosted to 62.27 $m^3/h$ so that bulk consumption is reduced to 6.29 $m^3$ for each 8 hrs 10 min sequence.

Comparative Examples 1-3

I. One conventional solution for meeting this customer need would be to size the generator for 100 $m^3/h$, and have a generator control set a reduced flow at 40 $Nm^3/h$ level. This is the design disclosed by U.S. Pat. No. 4,806,132.

However, this addresses only part of customer need, and does not address total need adequately in practice, due to the high cost of sizing the generator at 100 $m^3/h$, and due to the lowered product pressure available while operating the generator in a reduced flow mode.

II. Another conventional solution for meeting customer need would be to size the unit for average flow during customer operation, i.e., 52 $Nm^3/h$, with storage excess product for four hours, in a buffer tank, with delivery in addition to generator production during consumption storage.

This approach would improve system capital cost, but at the expense of added energy consumption for higher pressure storage in buffer tank.

III. Another conventional solution would be to size the unit for a given flow, e.g., 50 $Nm^3/h$ or less, and draw peak demands from an on-site bulk storage. This would decrease cost of generator but would dramatically increase operating cost. However, this kind of design is often necessary, when the customer insists on having an installed back-up system for safety reasons.

If unit is sized for 50 $Nm^3/h$, bulk consumption will be 8.33 $m^3$ for each 8 hrs. 10 min. sequence.

A summary of the above solutions is indicated below in Table I:

TABLE I

| Solution | Generator Size | Bulk Consumption |
| --- | --- | --- |
| Comp. Ex. 1 | 100 | 0 |

TABLE I-continued

| Solution | Generator Size | Bulk Consumption |
|---|---|---|
| Comp. Ex. 2 | 52 | 0 |
| Comp. Ex. 3 | 50 | 8.37 |
| present invention | 50 | 6.29 |

While this phenomenon is of moderate importance on small modules, it is particularly striking and surprising for large size industrial modules as noted below in Table II:

TABLE II

| production flow | % $O_2$ ideal module | % $O_2$ industrial module |
|---|---|---|
| 100 | 0.1 | 0.1 |
| 172 | 0.5 | 0.47 |
| 228 | 1 | 0.87 |
| 317 | 2 | 1.65 |
| 574 | 5 | 3.93 |

This table, based on industrial size module performance, shows that increased production flow on an existing plant, assuming that sufficient air feed is available, has much less impact on product purity than would be expected from computer simulation. This helps boosting system production in case of customer consumption surge when advantage is taken of installed pure nitrogen bulk back-up and mixing such pure nitrogen with membrane generator production the purity of which is set at all times at a value such that unit production is increased while keeping total product oxygen content under specified value.

EXAMPLE 2

Customer need: 2% $O_2$ in product with flow pattern as follows

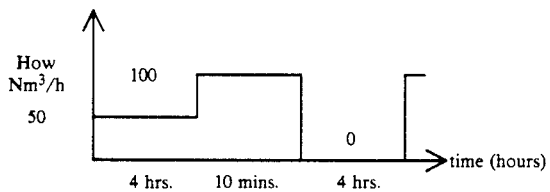

Basic flow is 50 $Nm^3/h$ at 2% $O_2$ content. Surges of 100 $Nm^3/h$ consumption at 2% $O_2$ occur during 10 mins every 4 hrs.

Then the consumption stops for 4 hrs and then starts all over again. Average flow is then 26.53 $Nm^3/h$.

In this particular case, the invention brings the benefit of a 25% reduction in liquid consumption at essentially the same capital cost as solution b. (Except an increase in necessary compressor size, but this is small in relative value).

EXAMPLE 3

Another example, seen in some industrial application, exhibits a flow pattern similar to one as shown below:

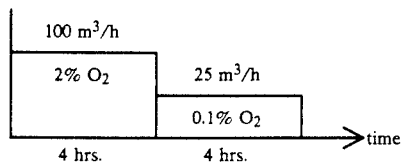

In the first period, customer requires a flow of 100 $m^3/h$ inert at a maximum $O_2$ content of 2%. In a second period, flow need falls down to 25 $m^3/h$ at a purity of 0.1% $O_2$ max.

The particulars from the four designs described above are summarized below in Table III:

TABLE III

| solution | generator size | bulk |
|---|---|---|
| a) 1. | 100 at 2% | 100 $m^3$ per 8 hrs |
| a) 2. | 100 at 0.1% (equivalent to 356 at 21%) | 0 |
| b) | not applicable | |
| c) | 25 at 0.1% | 300 $m^3$ per 8 hrs |
| invention | (equivalent to 89 $m^3/h$ at 2%) | 44 $m^3$ per 8 hrs |

Thus, the generator design according to the invention would save 85% of bulk consumption compared to solution C), while having a reduction on generator size over solution a)1 and a)2.

Hence, in accordance with the present invention, a membrane gas generator for example a nitrogen generator, is provided having increased flexibility with high productivity, which avoids expensive reliance upon assigned generators in meeting variations in customer demand.

Additionally, it is to be understood and hereby explicitly disclosed that it is equivalent to the presently claimed apparatus and process to employ any apparatus and/or process which satisfy the following two conditions:

a) produced gas is deliverable in bulk form as a standby source for customer needs in case of generator failure, and b) gas can be produced by an on-site generator with a strong correlation between production flow and purity.

For example, the above two conditions specifically apply to the production of either nitrogen or oxygen in the present invention.

While nitrogen may generally be produced in accordance with the process described above, oxygen may be produced in an analogous manner but using pressure swing adsorption (PSA)/vacuum swing adsorption (VSA) instead of membranes. Generally, in the production of oxygen, customer peak flow needs would be met using a mixture of stored bulk oxygen, having a nitrogen content of close to zero, and oxygen from PSA/VSA in a high production mode, having an increased nitrogen content. Such a method may be advantageously used in the production of oxygen from PSA/VSA having strict specifications for nitrogen content.

More specifically, in accordance with this method PSA/VSA is used to produce oxygen during periods of low demand having a nitrogen content which is lower, i.e., oxygen of higher purity, than is required by the customer. This higher purity oxygen is stored in one or more product storage means for subsequent use during periods of high demand.

During periods of high demand, PSA/VSA is used in a high production to produce oxygen in greater amounts but in lower purity (i.e., higher nitrogen content) than is required by the customer. However, this oxygen is then mixed with high purity oxygen which has been stored in the one or more product storage means to afford an increased production of oxygen having a purity which is in accordance with customer demand.

Those skilled in the art will appreciate that various changes and modifications can be made in the details of the invention without departing from the scope of the invention as set forth in the appended claims. Thus, the permeable membranes employed in the practice of the invention will commonly be employed in membrane assemblies typically positioned within enclosures to form a membrane system, as understood with reference to the invention, a membrane system comprises a membrane module or a number of such modules, arranged for either parallel or series operation. The membrane modules can be constructed in convenient hollow fiber form, or in spiral wound, pleated flat sheet membrane assemblies, or in any other desired configuration. Membrane modules are contracted to have a feed air surface side and an opposite permeate gas exit side. For hollow fiber membranes, the feed air can be added either to the bore side or to the other surface side of the hollow fibers.

It will also be appreciated that the membrane material employed for the air separation membrane and for the hydrogen purification membrane can be any suitable material capable of selectively permeating a more readily permeable component of the feed gas, i.e. air or impure hydrogen. Cellulose derivatives, such as cellulose acetate, cellulose acetate butyrate and the like; polyamides and polyimides, including aryl polyamides and polyimides, including aryl polyamides and aryl polyimides; polysulfones; polystyrenes and the like, are representative of such materials. However, in accordance with the present invention, polyimides are preferred.

As indicated above, the permeable membranes comprising the membrane system positioned within the insulated enclosure of the invention may be in any desirable form, with hollow fiber membranes being generally preferred. It will be appreciated that the membrane material employed in any particular gas separation application can be any suitable material capable of selectively permeating a more readily permeable component of a gas or fluid mixture containing a less readily permeable component. Cellulose derivatives, such as cellulose acetate, cellulose acetate butyrate, and the like; polyamides and polyimides, including aryl polyamides and aryl polyimides; polysulfones; polystyrenes and the like, are representative examples of such materials. It will be understood in the art that numerous other permeable membrane materials are known in the art and suitble for use in a wide variety of separation operations. As noted, the membranes, as employed in the practice of the invention, may be in composite membrane form, in asymmetric form or in any such form that it is useful and effective for the particular gas separation being carried out using the system and process of the invention.

The hollow fiber membranes are generally formed from a polymeric material which is capable of separating one or more fluids from one or more other fluids in a fluid mixture. The polymeric materials which may be used to prepare the hollow fiber membranes preferably include olefinic polymers, such as poly-4-methylpentene, polyethylene, and polypropylene; polytetrafluoroethylene; cellulosic esters, cellulose ethers, and regenerated cellulose; polyamides; polyetherketones and polyetheretherketones; polyestercarbonates and polycarbonates; polysulfones; polyimides; polyethersulfones; and the like. The hollow fiber membranes may be homogeneous, symmetric (isotropic), asymmetric (anisotropic), or composite membranes. The membranes may have a dense discriminating region which separates one or more fluids from one or more other fluids based on differences in solubility and diffusivity of the fluids in the dense region of the membrane. Alternatively, the membranes may be microporous and separate one or more fluids from one or more other fluids based on relative volatilities of the fluids.

Hollow fiber membranes with dense regions are preferred for gas separations. Asymmetric hollow fiber membranes may have the discriminating region either on the outside of the hollow fiber, at the inside (lumen surface) of the hollow fiber, or located somewhere internal to both outside and inside hollow fiber membrane surfaces. In the embodiment wherein the discriminating region of the hollow fiber membrane is internal to both hollow fiber membrane surfaces, the inside (lumen) surface and the outside surface of the hollow fiber membrane are porous, yet the membrane demonstrates the ability to separate gases. In the embodiment wherein gases are separated, the preferred polymeric materials for membranes include polyestercarbonates, polysulfones, polyethersulfones, polyimides, and the polycarbonates. More preferred polymeric materials for gas separation membranes include polycarbonates and polyestercarbonates. Preferred carbonate and polyestercarbonate membranes for gas separation include those described in U.S. Pat. Nos. 4,874,401, 4,851,014, 4,840,646, and 4,818,254; the relevant portions of each patent incorporated herein by reference for all legal purposes which may be served thereby. In one preferred embodiment, such membranes are prepared by the process described in U.S. Pat. No. 4,772,392, the relevant portions incorporated herein by reference for all legal purposes which may be served thereby.

Furthermore, in accordance with the present invention, either tube-fed or shell-fed hollow fiber membranes may be used, or either plate and frame or spiral wound film membranes may be used.

Having described the present invention, it will now be apparent that many changes and modifications may be made to the above embodiments without departing from the spirit and the scope of the present invention.

What is claimed and defined to be secured by United States Letters Patent is:

1. A process for providing nitrogen gas to a customer at a variable flow rate, but at a purity which is at least equal to $P_0$ whatever the flow rate of said nitrogen gas, comprising the steps of providing a first source of high purity nitrogen gas having a purity which is greater than $P_1$ $P_1 > P_0$ and a second source of low purity nitrogen gas having a purity $P_2$ which is dependant upon its flow rate, said purity being lower than $P_0$ when its flow rate is about its maximum flow rate and greater than $P_0$ at lower flow rates, measuring the purity P of the low purity nitrogen gas, comparing P to $P_0$, and when $P < P_0$, mixing the high purity nitrogen gas to the low purity nitrogen gas and delivering to the customer a gas mixture which purity is greater than or at least equal to $P_0$ and when $P \geq P_0$, delivering directly the low purity nitrogen gas to the customer, the flow rate of the nitrogen gas provided to the customer being adjusted as a function of its need.

2. The process according to claim 1, wherein the second source of low purity nitrogen gas comprises a nitrogen membrane fed by a pressurized source of nitrogen containing gas.

3. The process according to claim 2, wherein the pressurized source of nitrogen containing gas is an air compressor.

4. A membrane nitrogen generator adapted to deliver a flow rate of nitrogen gas having a purity which is at least equal to $P_0$, comprising:
   (a) a source of compressed nitrogen-containing gas having a purity lower than $P_0$, said source having a maximum flow rate $Fm_1$;
   (b) varying means in fluid connection with said source of compressed nitrogen-containing gas which is adapted to vary the flow rate of said source between $Fm_1$ and zero;
   (c) a nitrogen membrane in fluid connection with said source of compressed nitrogen-containing gas and which is capable of delivering a low purity nitrogen gas which is enriched in nitrogen compared to said source and a nitrogen-depleted gas which is depleted in nitrogen compared to said source, said low purity nitrogen gas having a purity $P_1$ which increases when the flow rate of said nitrogen containing gas source feeding the membrane decreases, said purity $P_1$ being lower than $P_0$ at said maximum flow rate $Fm_1$;
   (d) a source of high purity compressed nitrogen gas having a purity which is greater than $P_0$ delivering a high purity nitrogen gas having flow rate control means to control its flow rate from zero to a maximum flow rate value $Fm_2$;
   (e) mixing means adapted to mix said low purity nitrogen gas and said high purity nitrogen gas and delivering a nitrogen gas mixture; and
   (f) purity control means adapted to measure the purity of the nitrogen gas mixture and to generate a signal to the flow rate control means to increase the flow rate of the high purity nitrogen gas when the measured purity of said nitrogen gas mixture is smaller than or equal to $P_0$ and to decrease the flow rate of the high purity nitrogen gas when the measured purity of said nitrogen gas mixture is greater than $P_0$.

5. The membrane nitrogen generator according to claim 4, wherein the flow rate control means to control the flow rate of the source of high purity compressed nitrogen gas is an on/off valve.

6. The membrane nitrogen generator according to claim 4, wherein the source of high purity compressed nitrogen gas is a tank containing liquid nitrogen.

7. The membrane nitrogen generator according to claim 4, wherein said purity control means are adapted to measure the purity of the low purity nitrogen gas and to generate a signal to the flow rate control means to increase the flow rate of the high purity nitrogen gas when the measured purity of said nitrogen gas mixture is smaller than or equal to $P_0$ and to decrease the flow rate of the high purity nitrogen gas when the measured purity of said nitrogen gas mixture is greater than $P_0$.

8. The membrane nitrogen generator according to claim 4, further comprising computer means connected to the varying means or the purity control means or both to manage the control of said varying means or purity control means or both.

9. The membrane nitrogen generator according to claim 4, wherein the nitrogen membrane comprises a plurality of hollow fibers forming a bundle which is encased in substantially cylindrical shell forming altogether a module.

10. The membrane nitrogen generator according to claim 9, wherein said module comprises an input for feed gas from the nitrogen-containing gas source, a first output for the permeate gas which permeates through the walls of the fibers of the bundle and a second output for the non-permeate gas or gas mixture which does not permeate through the fibers, wherein said input and first output are located on the shell of the module in such a way that the feed and the permeate gas circulate substantially countercurrent in the shell of the module.

* * * * *